2,830,973
Patented Apr. 15, 1958

2,830,973

PREPARATION OF OLEFIN-AROMATIC COPOLYMERS WITH CROSS-LINKING AGENTS

Robert F. Leary, Cranford, N. J., assignor to Esso Research and Engineering Company, a corporation of Delaware No Drawing. Application December 9, 1955
Serial No. 551,981

10 Claims. (Cl. 260—80.5)

The present invention relates generally to novel hydrocarbon copolymer compositions and to processes for their preparation. More particularly, it relates to the copolymerization of an olefin-containing mixture containing at least three different olefins of the hydrocarbon type to yield novel relatively gel-free resin-like compositions which possess improved properties. The present invention is a continuation-in-part of U. S. patent application, Serial No. 259,480, filed December 1, 1951, in the name of Robert F. Leary, now abandoned.

It has previously been known that certain aliphatic olefins, especially iso-mono-olefins, such as isobutylene, 2-methyl-1-butene, or other lower olefins, including propylene, can be copolymerized with unsaturated aromatic hydrocarbon compounds such as styrene, alpha-methyl-styrene, dihydronaphthalene, indene, and particularly with vinyl compounds of the vinyl cyclic hydrocarbon type, such as styrene, paramethyl styrene, or their chlorinated derivatives such as parachlorostyrene, dichlorostyrene, etc. at low temperatures using an active Friedel-Crafts catalyst such as aluminum chloride, boron fluoride, and the like. These resin materials can be prepared by the procedure as described in U. S. Patent 2,274,749 and the materials so produced are valuable, colorless resins and plastics of relatively high molecular weight. It has been discovered that the resin materials made by this general method known to the prior art differ somewhat depending on the particular mono-olefin employed, the particular cyclic compound employed, the ratio of these two olefinic reactants, and finally the temperature of polymerization which is found to be a particularly important factor in influencing the molecular weight.

Generally speaking, there are two chief types of compounds which may be produced by known methods. The first of these compounds is a hard, brittle resin which may have a molecular weight of from 800 to 5000 as measured by the Staudinger method. This hard, brittle material is prepared by the polymerization of the reactants at a temperature in the range of from about 0° to —40° C., preferably, about —20° to —40° C. This material possesses thermoplastic characteristics and contains from about 25 up to 80%, advantageously 30 to 75%, preferably, 40 to 70% of the combined vinyl compound. About 40 to 50% is the minimum combined vinyl compound required for a hard resin. The product is white or colorless, odorless, tasteless, and quite brittle. These resins have ring-and-ball heat softening points between about 30 and 110° C. and have flash points by the open cup method of about 400° to 450° F. The molecular weight range given above corresponds roughly to an intrinsic viscosity of about 0.05 to 0.40, advantageously, 0.1 to 0.35, preferably, 0.2 to 0.35. This resin material is useful as a hard, brittle product. It can be used in coating compositions and should be applied by spraying or brushing either the melted resin itself or a volatile solvent solution thereof.

The second important type of this compound which can be made by the general method described above is prepared at a low temperature, i. e., well below —50° C., preferably below —80° C. and may be prepared at temperatures down to —150° C. Ordinarily, this type of resin is prepared at the temperature of boiling ethylene, which temperature is —103° C. This material so prepared is colorless, odorless, tasteless, and thermoplastic to a certain extent. It is itself non-brittle, flexible and somewhat elastic. The molecular weight of this product is considerably higher than that of the copolymer prepared at the higher temperature. The Staudinger molecular weight may be from 10,000 to 80,000 or even higher, up to 200,000. The corresponding intrinsic viscosity ranges from 0.50 to 1.50. Copolymers of this type may contain from about 30% up to 70% styrene and preferably from about 40% to 65% styrene. This product can be employed for certain purposes just as it is produced.

The copolymers of the first type, which are prepared at the relatively high temperatures of —20° to —40° C., and have at least about 30%, and preferably at least 50% combined styrene, possess certain distinct advantages which are not obtained in the polymers prepared at the lower temperatures of well below —50° C. These include hardness and strength and relatively non-tacky surface, all desirable properties which are not characteristic of the lower temperature resin. On the other hand, the low temperature second type of resins show higher intrinsic viscosity and correspondingly higher Staudinger molecular weight values, with higher tensile strengths and greater extensibility, which are desirable characteristics not shown by the higher temperature products.

It has now been discovered that the most desirable of the physical characteristics of the two previously known types of polymers, such as elevated intrinsic viscosity and elongation, can be obtained in products prepared by a novel process which includes the presence of critical amounts of at least one diolefinic, cross-linking compound, such as a divinyl aromatic compound in the polymerization feed, without the necessity of using lower temperatures. The cross-linking agent should be present in at least sufficient amounts to raise the intrinsic viscosity by a factor of at least about 1.5, compared to the same copolymer with no cross-linking agent, but not enough to produce excessive amounts of gel. The foregoing procedure allows the preparation of copolymer products having high Staudinger molecular weights, for example, as shown by intrinsic viscosity values of about 0.50 to 0.75. More particularly, gel formation should be maintained at a level not exceeding 15% by weight of the final product copolymer. It has been found that the above purposes may be generally accomplished by limiting the amount of cross-linking agent to not more than about 1.5% by weight based on total monomers. The exact amount of the cross-linking agent to be employed within these limits depends to a certain extent on the ratio of the monomers. This can be readily determined for each respective monomeric mixture by preliminary tests following the teachings of the invention. Amounts between 0.2 to 1.5% are useful, proportions of about 0.5 or especially 1.0 to 1.5% being preferred. By employing the foregoing amounts of the cross-linking agent within the limits described, the intrinsic viscosity can be raised by a factor of from 1.5 up to about 3.0, especially between about 1.8 and 2.6. At the same time it has been further found that the above copolymers from reaction mixtures having diolefinic, cross-linking agents present, can readily be prepared at relatively high polymerization temperatures of from 0° to −40° C., preferably, −20° to −40° C.

In carrying out the invention, the first ingredient necessary in the reaction mixture is preferably an aliphatic iso-olefin having from 4 up to 8 carbon atoms. Olefins which are especially desirable include isobutylene, 2-methyl-1-pentene or a pentene which is obtained by the dehydration of secondary amyl alcohol. Isobutylene is particularly preferred.

The second ingredient of the reaction mixture is a polymerizable organic compound preferably containing at least one cyclic nucleus. The preferred type of compound for the second reactant is a mono-vinyl aromatic compound although other aromatic olefin reactants can be employed. Compounds which are useful include styrene, indene, the terpenes, and the like. From 20 to 75%, advantageously, 30 to 70%, and preferably from 40 to 65% of the vinyl aromatic compound which is preferably a hydrocarbon can be used.

The third type of reactant, which is the modifying olefin, is a reagent capable of forming cross-linkages during polymerization. The materials particularly desirable for this purpose are divinyl aromatic hydrocarbons such as divinyl benzene, divinyl naphthalene etc. It should be pointed out that divinyl benzene, which is the preferred cross-linking agent, is difficult to obtain in a pure state because of the indirect methods employed for its preparation. The reactant employed in the examples shown below was a 40% solution of divinyl benzene containing also ethyl benzene, diethyl benzene, and the ethyl styrenes. The percentages which are given are those which have been calculated as pure divinyl benzene. As beforementioned, there appears to be a critical maximum limitation of about 1.5% of the divinyl aromatic cross-linking agent, such as divinyl benzene, based on the total olefinic reactants, which can be employed. If larger amounts of cross-linking agent are used in the polymerization mixture, the amount of gel formed and present in the final product is excessive, there being a drastic and unpredicted increase in the amount of gel for even slight increases in the amount of cross-linking agent employed.

The copolymerization of the three reactants is effected by mixing the two major reactants either with or without a mutual solvent and thereafter adding the cross-linking agent either all at once or portion-wise during the polymerization period. It is also possible to mix the three reactants together initially and thereafter effect the copolymerization. It is best that the ingredients employed should be soluble in each other. If this is not the case, then a mutual solvent should be employed. Materials such as liquid methyl chloride, ethyl chloride, refined naphtha, and the like can be used solvents. After adjusting the temperature of the reactants to 0° to −40° C., preferably, −20° to −40° C., there is added to the olefinic mixture an active Friedel-Crafts catalyst which is capable of causing the polymerization. Catalysts which may be employed include aluminum chloride, aluminum bromide, boron fluoride, titanium tetrachloride, zirconium chloride, and various halide-containing complexes which are known to the art as effective Friedel-Crafts polymerization catalysts. Preferably, the catalyst is dissolved in a solvent which may be a lower alkyl halide, such as methyl chloride or ethyl chloride, a low molecular weight, saturated hydrocarbon, a fluorinated hydrocarbon such as dichlorodifluoromethane and the like, and carbon disulfide. Various solvents and/or diluents may also be employed as internal or external refrigerants to absorb the liberated heat of polymerization and control the polymerization temperature within the range of about 0° to −40° C., preferably, −20° to −40° C.

After completion of the copolymerization, the residual catalyst may be inactivated with some compound such as an alcohol, for example isopropyl alcohol, or water, or aqueous caustic soda, and the excess catalyst is removed thereafter by washing the polymer product with water and preferably also with dilute aqueous caustic soda. The volatile solvent may be removed if desired.

In general, the resin products according to the invention range from hard, brittle products to flexible, thermoplastic materials; the minimum intrinsic viscosity being about 0.50 and the maximum about 0.75.

The invention will be illustrated more particularly by the examples set out below although it is not intended to limit the invention thereto.

EXAMPLE I

About 123 grams of styrene, 185 grams of isobutylene, and 1130 grams of methyl chloride, together with about 1.6% divinyl benzene, based on the total monomers present, were placed in a reaction vessel fitted with an external propane-filled jacket. This mixture was polymerized to essentially complete conversion by the addition of catalyst consisting of aluminum chloride dissolved in methyl chloride. The heat of reaction caused the reaction mixture to boil, and the polymerization occurred at a temperature within the range of from −40° to about −24° C. The polymer so obtained had a measured intrinsic viscosity of 0.77. The amount of gel was not recorded.

The above experiment was repeated, every detail being the same except that the 1.6% of divinyl benzene was omitted. The unmodified polymer so obtained had an intrinsic viscosity of 0.25.

EXAMPLE II

Further examples of the reaction have been carried out in a series of experiments in which styrene-isobutylene copolymers prepared from mixtures containing from 30 weight percent to 60 weight percent of styrene were polymerized. The resulting data are shown in tabular form in Table I following. All the reaction mixtures were polymerized at temperatures above about −40° C. up to about −24° C., there being comparative experiments in which divinyl benzene was both present and absent in the reaction feed. It is a surprising discovery that, in every case, the addition of from 1.3 to 1.6% of divinyl benzene caused a two to three-fold increase in the intrinsic viscosity of the resulting copolymer. All of the feeds were diluted with approximately 2.6 volumes of methyl chloride and were polymerized by the intermittent addition to the reaction mixture of aluminum chloride dissolved in methyl chloride as a solvent. The temperature in most cases was controlled by external propane refrigeration. The divinyl benzene was added to the mixture as a 40% pure reactant. The amount shown was added in two or three portions during the reaction period.

As an additional effect of the reaction, it was also noted that the addition of the divinyl benzene produced an increase in the amount of polymeric gel which is insoluble in benzene. This benzene insoluble portion which is an undesirable contaminant of the copolymer was recorded as percent gel in the product. The data below clearly show in runs IV (b) and (c) that having a copolymer of a given styrene composition, a slight excess in the amount of the divinyl benzene cross-linking agent produces a surprisingly drastic and unpredictable increase in the amount of gel formation. It would appear from data collected that about from 0.5 up to 1.5% of divinyl benzene is the range most satisfactory and about 1.0% to 1.5 of divinyl benzene gives excellent results. The data are tabulated below:

Table I[1]

POLYMERIZATION OF ISOBUTYLENE-STYRENE COPOLYMER WITH CROSS-LINKING AGENT

| Run No. | | Composition of Basic Feed | Polymerization Temp., °C. | Percent Divinyl Benzene Added | Intrinsic Viscosity | Percent Gel |
|---|---|---|---|---|---|---|
| I | (a) | 30% Styrene, 70% Isobutylene. | −40 to −35 | 0 | 0.33 | 1.2 |
|   | (b) | ...do... | −40 to −35 | 1.3 | 0.59 | 2.5 |
| II | (a) | 40% Styrene, 60% Isobutylene. | −40 to −24 | 0 | 0.25 | |
|    | (b) | ...do... | −40 to −35 | 0 | 0.27 | 1.01 |
|    | (c) | ...do... | −40 to −35 | 1.3 | 0.51 | 8.5 |
|    | (d) | ...do... | −40 to −24 | 1.6 | 0.77 | |
| III | (a) | 50% Styrene, 50% Isobutylene. | −40 to −35 | 0 | 0.24 | 1.06 |
|     | (b) | ...do... | −40 to −35 | 1.3 | 0.60 | 1.23 |
| IV | (a) | 60% Styrene, 40% Isobutylene. | −40 to −35 | 0 | 0.28 | 1.5 |
|    | (b) | ...do... | −40 to −35 | 1.4 | 0.72 | 2.9 |
|    | (c) | ...do... | −40 to −35 | 1.6 | | 72.0 |

[1] All percentages are percent by weight.

The above data in Table I further show that when polymerizing isobutylene with styrene at a temperature between about −35° to −40° C. without added divinyl benzene, copolymers having intrinsic viscosities between about 0.24 to 0.33 are formed. However, when 1.3 to 1.4% divinyl benzene was added to the monomers prior to polymerization, the resulting intrinsic viscosities were between about 0.51 to 0.72. It will also be noted that the factor by which the intrinsic viscosity of the copolymer has been raised varies between about 1.79 (run No. I) to about 2.57 (run No. IV, employing 1.4% added divinyl benzene).

Table II below shows the results obtained from physical tests carried out on molded slabs of the polymers prepared by Example II:

Table II

PHYSICAL TESTS ON MOLDED SLABS

| Run No. | | Tens. | Elong. | Hardness | Wms. Plast.-Rec. | | | |
|---|---|---|---|---|---|---|---|---|
|  |  |  |  |  | 30° C. | 50° C. | 70° C. | 90° C. |
| I | (a) | (1) | (1) | (1) | (1) | (1) | (1) | (1) |
|   | (b) | 70 | 1,100+ | 48 | 167−30 | 111−8 | 88−1 | 58−0 |
| II | (a) | | | | | | | |
|    | (b) | 215 | 550 | 58 | 173−11 | 85−1 | 53−0 | |
|    | (c) | [2] 70 | 1,100+ | 54 | 148−20 | 99−4 | 74−1 | 52−1 |
|    | (d) | 280 | 950 | 71 | 348−18 | 168−7 | 94−1 | 70−0 |
| III | (a) | 390 | 180 | 83 | 325−20 | 119−2 | 62−0 | 66−0 |
|     | (b) | 430 | 770 | 88 | 311−26 | 149−5 | 98−2 | |
| IV | (a) | 1,550 | 80 | 91 | 406−4 | 342−3 | 103−4 | 50−0 |
|    | (b) | 2,040 | 120 | 86 | 412−3 | 376−8 | 177−20 | 98−2 |
|    | (c) | | | | | | | |

[1] Too soft and sticky to measure.
[2] Sample could not be stretched to breaking point as the elongation exceeded the capacity of the testing machine.

The above data show that for the increase in intrinsic viscosity given by the presence of critical amounts of divinyl benzene in the feed according to the invention, there is a corresponding increase in the elongation and softening point of the molded slabs. In some cases, an increase in tensile strength is also shown. For instance, the addition of 1.3% divinyl benzene according to the invention in run I (b) changed the copolymer from a useless sticky mass into a desirable resin with measurable physical properties. Similarly, the addition of 1.3% divinyl benzene according to the invention in run III (b) raised the elongation from 180% to 770%.

The following experiments were carried out under the polymerization conditions of run No. III (a), Table I, except that the polymerization temperatures and resulting intrinsic viscosities of the isobutylene-styrene copolymer formed were as follows:

| Run No. | | Polymerization Temperature, °C. | Polymer Intrinsic Viscosity |
|---|---|---|---|
| V | (a) | −68 | 0.55 |
|   | (b) | −77 | 0.67 |
|   | (c) | −82 | 0.72 |

The above data show that when no divinyl benzene is used according to the prior art, temperatures of −68° C. to −82° C. are required in order to obtain an isobutylene-styrene copolymer having an intrinsic viscosity of at least 0.50 (e. g. 0.55 to 0.72). On the other hand, the same range of intrinsic viscosities can be obtained according to the present invention at higher temperatures of −20° C. to −40° C. Also, at polymerization temperatures of −20° C. to −40° C. copolymers of isobutylene and styrene without added divinyl benzene have intrinsic viscosities of only about 0.20 to 0.35, e. g., 0.24 to 0.33 as shown in Table I.

Two additional experiments were carried out under the polymerization conditions of run Nos. III (a) and III (b) except that the polymerization temperature was regulated at between −45° to −53° C. The results were as follows:

| Run No. | | Percent Divinyl Benzene Added | Percent Gel |
|---|---|---|---|
| VI | (a) | 0 | 0 |
|    | (b) | 1.3 | 29 |

The above data show that at a polymerization temperature of about −50° C. (e. g., −45° to −53° C.) the addition of 1.3% divinyl benzene resulted in the production of 29% undesirable gel. For an effective and economical process not more than 15% gel can be tolerated. Thus, it is apparent that even a small excess of divinyl benzene (e. g. 0.2% excess) as in run IV (c) or a slight lowering of the polymerization temperature below −40° C. under otherwise identical conditions results in the production of about 30% to 70% undesirable gel. Therefore, in practicing the present invention, the amount of divinyl benzene as well as the copolymerization temperature must be carefully controlled within the limits specified herein.

EXAMPLE III

In a series of runs designed to demonstrate that the reaction occurring in the presence of the two major olefinic reactants and the divinyl benzene forms an improved tripolymer, the data shown in Table III were obtained. In this series, runs VII (a) and (b) were prepared according to the general procedure described in Example II. However, in run VII (c) the divinyl benzene was added at the end of the reaction period, after the styrene and isobutylene had been substantially completely copolymerized. Although more catalyst was subsequently added, no further reaction appears to have occurred, the result showing that the intrinsic viscosity of a copolymer prepared without divinyl benzene present during the polymerization is changed very little by the subsequent addition of the divinyl benzene together with additional catalyst.

These modified resins can be employed as such for all types of uses to which such materials are adaptable for making of articles. In addition, they may, if desired, be used as additives in lubricating oils and in waxes, such as paraffin wax, and may be admixed with natural rubber, synthetic rubbers and polymers, and with various other kinds of resins and plastics.

Table III

| Run No. | Weight Percent of Styrene in Feed | Polymerization Temperature, °C. | Percent Divinyl Benzene Added | Intrinsic Viscosity | Percent Gel |
|---|---|---|---|---|---|
| VII (a) | 50 | −40 to −35 | 0 | 0.24 | 1.06 |
| VII (b) | 50 | −40 to −35 | 1.3 | 0.60 | 1.91 |
| VII (c) | 50 | −40 to −35 | 1.3 | 0.31 | 0.79 |

While there are above described a number of specific embodiments of the present invention, it is obviously possible to produce other embodiments and various equivalent modifications and variations thereof without departing from the spirit of the invention or the scope of the appended claims.

What is claimed is:

1. A process for copolymerizing a monomeric mixture of about 25 to 80% of a $C_4$–$C_8$ aliphatic isoolefin with about 20 to 75% of a polymerizable monoolefinic mononuclear vinyl aromatic compound having the vinyl group attached directly to the aromatic nucleus, which comprises adding to said mixture, prior to polymerization, a mononuclear divinyl aromatic compound having the two vinyl groups directly attached to the aromatic nucleus, and copolymerizing the three-component blend formed, at a temperature level between about 0° to −40° C. in the presence of a Friedel-Crafts catalyst to produce a substantially clear, colorless, solid tripolymer having an intrinsic viscosity of between about 0.50 to 0.75; said mononuclear divinyl aromatic compound being present in an amount at least sufficient to raise the intrinsic viscosity of the product copolymer by a factor of about 1.5 compared to copolymers produced at a temperature level between about 0° and −40° C. in the absence of mononuclear divinyl aromatic compounds, but insufficient to produce more than about 15% by weight of gel based on product copolymer, said amount being between about 0.2 to 1.5 weight percent based on total monomers said isoolefin and monoolefinic mononuclear vinyl aromatic compound, if copolymerized at a temperature level between about 0° and −40° C. in the absence of said mononuclear divinyl aromatic compound resulting in a product copolymer having an intrinsic viscosity of between about 0.05 and about 0.35.

2. In a process of copolymerizing a mixture of about 30 to 70% isobutylene with about 30 to 70% of a polymerizable monoolefinic mononuclear vinyl aromatic hydrocarbon having the vinyl group attached directly to the aromatic nucleus, which if copolymerized at a temperature level between about 0° to −40° C. has an intrinsic viscosity of about 0.05 to 0.35; the improvement which comprises blending with said mixture, prior to polymerization, a mononuclear divinyl aromatic hydrocarbon having the two vinyl groups directly attached to the aromatic nucleus, and copolymerizing the three-component blend formed, at the aforesaid temperature level, in the presence of a Friedel-Crafts catalyst to produce a substantially clear, colorless, solid tripolymer having an elevated intrinsic viscosity of between about 0.50 to 0.75; said divinyl aromatic hydrocarbon being present in an amount of between about 0.5 to 1.5 weight percent based on total monomers, said amount being insufficient to produce more than about 15% by weight of gel based on product copolymer.

3. In a process of copolymerizing a mixture of about 30 to 70% of a $C_4$–$C_7$ isoolefin with about 30 to 70% styrene, which if copolymerized at a temperature level between about 0° to −40° C. has an intrinsic viscosity between about 0.10 to 0.35; the improvement which comprises blending with said mixture, prior to polymerization a mononuclear divinyl aromatic hydrocarbon having the two vinyl groups attached directly to the aromatic nucleus and copolymerizing the three-component blend formed at the aforesaid temperature level in the presence of a catalyst comprising an aluminum halide dissolved in an alkyl chloride diluent to produce a substantially clear, colorless, solid tripolymer having an elevated intrinsic viscosity of about 0.50 to about 0.75; said divinyl aromatic hydrocarbon being present in an amount at least sufficient to raise the intrinsic viscosity of the product copolymer by a factor of about 1.5 compared to copolymers produced at a temperature level between about 0° and about −40° C. in the absence of mononuclear divinyl aromatic hydrocarbons but insufficient to produce more than about 15% by weight of gel based on product copolymer, said amount being between about 0.5 to 1.5 weight percent based on total monomers.

4. In a process of copolymerizing a mixture of about 40 to 60% of isobutylene with about 40 to 60% of styrene, which if copolymerized at a temperature level between about 0° to −40° C. has an intrinsic viscosity between about 0.10 to about 0.35; the improvement which comprises blending with said mixture, prior to polymerization, a mononuclear divinyl aromatic hydrocarbon having the two vinyl groups directly attached to the aromatic nucleus, and copolymerizing the three-component blend formed at the aforesaid temperature level in the presence of a Friedel-Crafts catalyst to produce a substantially clear, colorless, solid tripolymer having an elevated intrinsic viscosity of about 0.50 to about 0.75; said mononuclear divinyl aromatic hydrocarbon being present in an amount of between about 1.0 to 1.5 weight percent based on total monomers, said amount being insufficient to produce more than about 15% by weight of gel based on product copolymer.

5. In a process of copolymerizing a monomeric mixture of about 40 to 70% isobutylene with about 30 to 60% styrene, which if copolymerized at a temperature level between about −20° to −40° C. has an intrinsic viscosity between about 0.20 to about 0.33; the improvement which comprises blending with said mixture, prior to polymerization, about 1.3 to 1.4% of divinyl benzene, based on total monomers, and copolymerizing the three-component blend formed at the aforesaid temperature level in the presence of a catalyst comprising an aluminum chloride catalyst dissolved in methyl chloride to produce a substantially clear, colorless, solid tripolymer having an elevated intrinsic viscosity of between about 0.50 to about 0.75, said tripolymer containing less than about 15% by weight of gel.

6. A process according to claim 1 in which the isoolefin is isobutylene.

7. A process according to claim 1 in which the monoolefinic mononuclear vinyl aromatic compound is styrene.

8. A process according to claim 1 in which the Friedel-Crafts catalyst is an aluminum halide.

9. A process according to claim 1 in which the intrinsic viscosity of the copolymer formed is raised by a factor of at least about 1.5 by adding to the monomer feed about 1.0 to 1.5 weight percent based on monomers of the divinyl mononuclear aromatic compound.

10. A process according to claim 4 in which the divinyl mononuclear aromatic hydrocarbon is divinyl benzene.

References Cited in the file of this patent

UNITED STATES PATENTS

| | | |
|---|---|---|
| 2,202,846 | Garvey | June 4, 1940 |
| 2,274,749 | Smyers | Mar. 3, 1942 |
| 2,474,807 | Schoene | July 5, 1949 |
| 2,610,962 | Smyers et al. | Sept. 16, 1952 |